I. W. LITTLE.
Ox-Yoke.
No. 10,937.
Patented May 16, 1854.
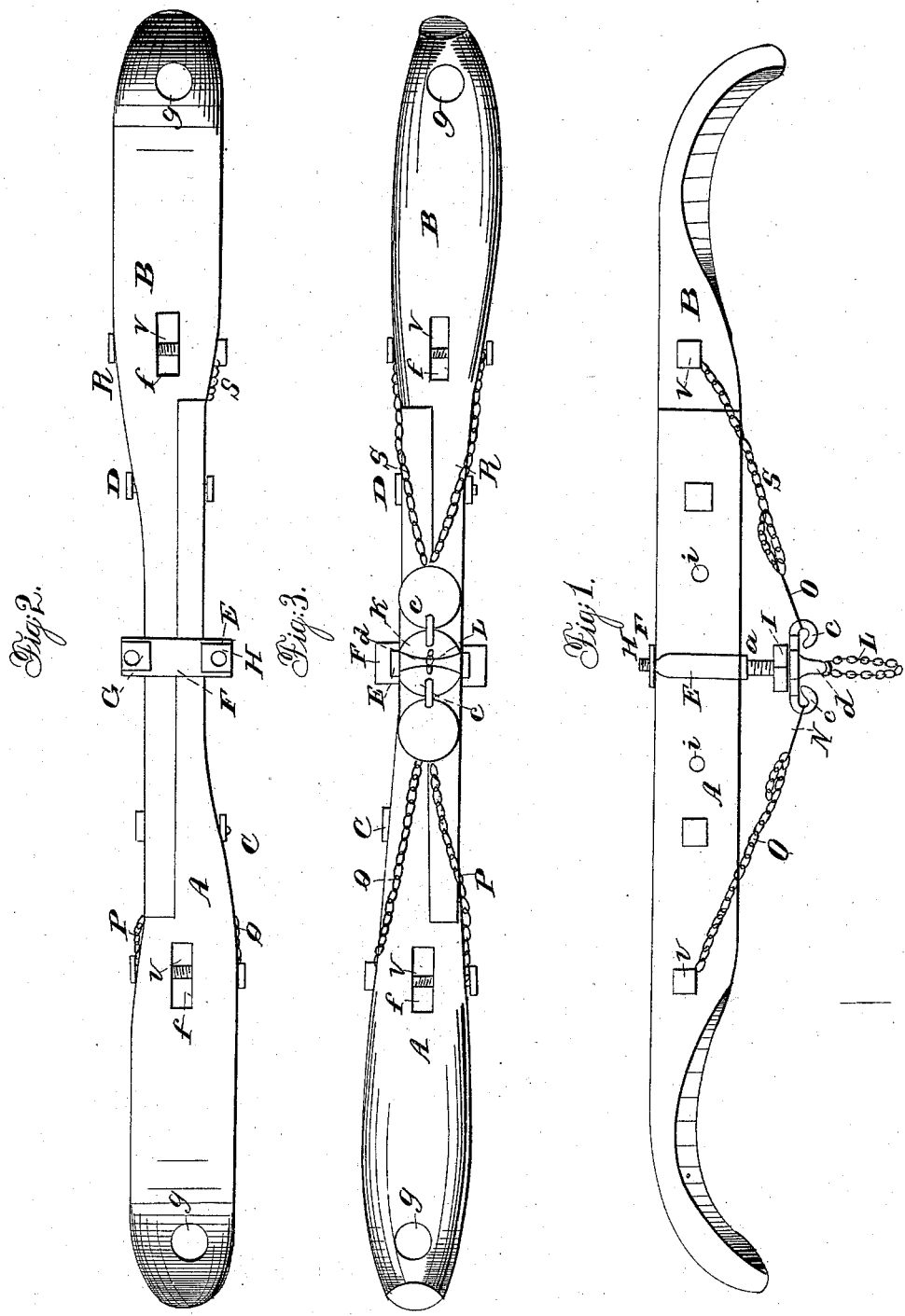

UNITED STATES PATENT OFFICE.

ISAAC W. LITTLE, OF NEWBURY, MASSACHUSETTS.

OX-YOKE.

Specification of Letters Patent No. 10,937, dated May 16, 1854.

*To all whom it may concern:*

Be it known that I, ISAAC W. LITTLE, of Newbury, in the county of Essex and State of Massachusetts, have invented a new and useful Improvement in Ox-Yokes; and I do hereby declare that the same is fully described and represented in the following specification and the accompanying drawings, letters, figures, and references thereof.

Of the said drawings Figure 1 represents a side elevation of my improved ox yoke. Fig. 2 is a top view of it, and Fig. 3 is an underside or bottom view of it.

The wooden part, as represented in the drawings, is formed of two parts A, B, which are scarfed upon or made to overlap each other and are confined together by means of screw bolts and nuts, as seen at C, D. A Y clasp or stirrup E, is made to embrace the said two parts A, B, in the middle of the yoke and to be confined in place thereon by means of a cross bar F, and screw nuts G, H, which are screwed upon the two ends of the stirrup which extend through the bar F. On the shank *a*, of this stirrup there is a male screw cut, on which a screw-nut I, is screwed, it being made to operate against a chain holder K, that slides on the screw. This chain holder is formed with three eyes, *c*, *d*, *e*, the middle one of which serves to sustain the ring or chain L, by which the yoke is applied to the tongue of a cart. The other two eyes carry respectively two rings N, O, to each of which two chains P, Q, or R, S, are attached, as seen in the drawings, the outer ends of each two of such chains being attached to the yoke by means of screw bolts U, V, one of said bolts being passed through each of the parts A, B, and also through an oblong slot or passage *f*, which is made of a size sufficient to receive the screw bolt and also one of the legs of the neck bow of the yoke, either on one side or the other of the said screw bolt. The object of making the said slot of such size is to enable the oxbow (which is inserted through said slot and a hole *g*, formed near the end) to be enlarged or contracted in its width, so as to adapt to it to oxen whose necks may vary in size or thickness. Through each of the parts A, B, there may be bored one or more other holes, as seen at *i*, in order to enable a person to lengthen the yoke or the distance of its two bows asunder, the said holes being arranged in each of the parts, so as to permit such to be effected by extending the two parts A, B, asunder, so as to increase the distance between the two bows and subsequently passing their connecting screw bolts through them and the said secondary holes, it being understood that the straining chains P, Q, and R, S, are first released from their rings. After the two parts A, B have been extended the straightening chains are replaced in their rings or carried through them and the end of each chain is hooked into some one of the links. Next by means of the straining screw nut I, and the screw on which it works these chains are to be strained tight. It is by means of these chains that the load is suspended, as it were, to the yoke and from those parts of it which rest directly upon the necks of the oxen. By using chains in this manner I am enabled to make the yoke itself, and particularly that part of it extending between its bows, much lighter than it is usually made, and also to make it so that it may be either extended or contracted in length in the manner as above set forth.

What therefore I claim as my invention is—

The making of the yoke in two parts A B, scarfed, bolted and confined together as set forth, and combining with them the sustaining chains, the chain holder K, and the stirrup screw and nut all substantially as specified.

In testimony whereof I have hereunto set my signature this twenty fourth day of February, A. D. 1854.

ISAAC W. LITTLE.

Witnesses:
ANNA W. COFFIN,
M. H. COFFIN.